Oct. 9, 1934.  O. WERNER  1,976,706
BEACON AND AIR CURRENT INDICATOR
Original Filed Nov. 30, 1926
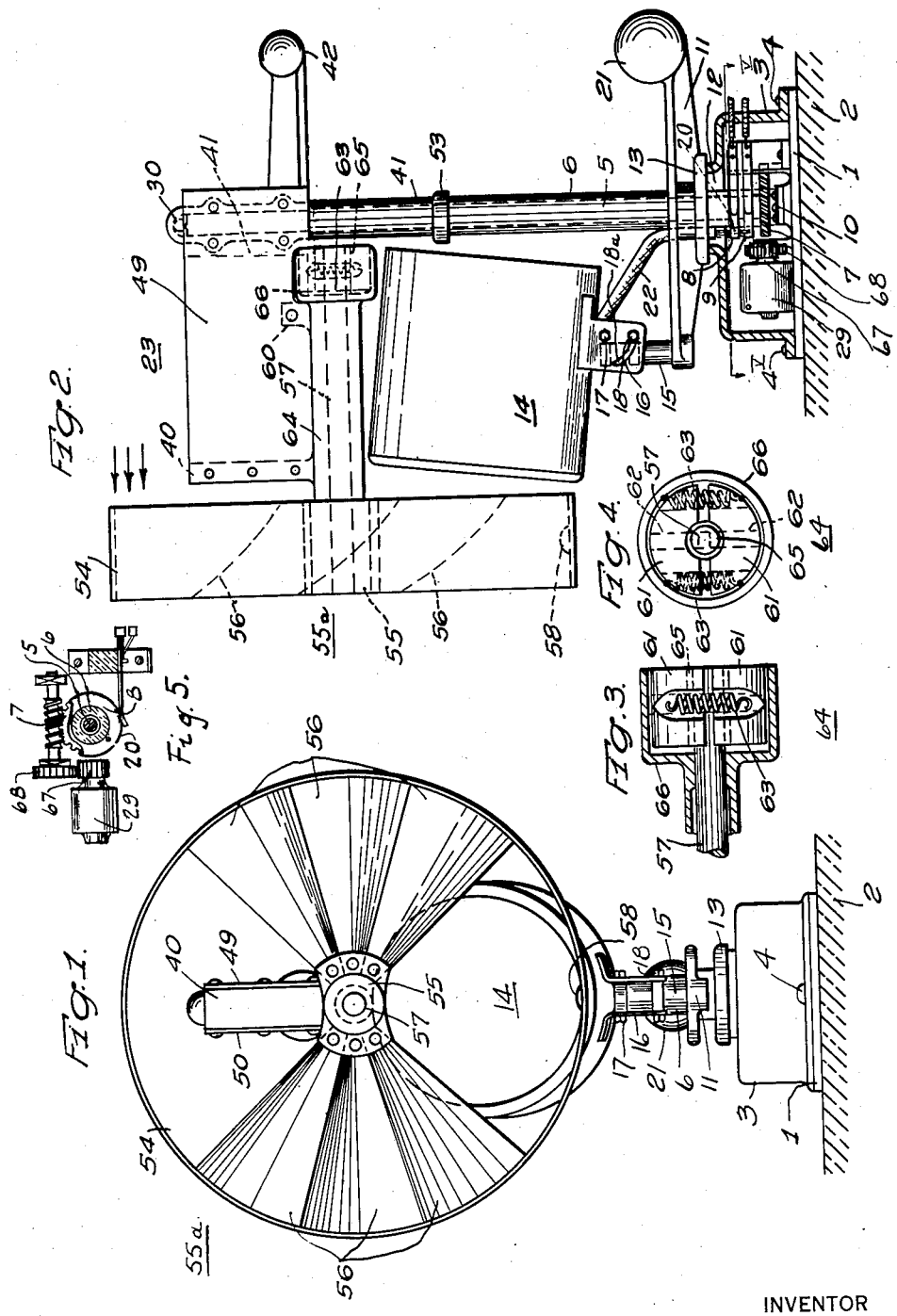
INVENTOR
Oscar Werner
BY
ATTORNEY Patented Oct. 9, 1934

1,976,706

UNITED STATES PATENT OFFICE 1,976,706

BEACON AND AIR CURRENT INDICATOR

Oscar Werner, South Bend, Ind., assignor, by mesne assignments, to Westinghouse Electric & Manufacturing Company, East Pittsburgh, Pa., a corporation of Pennsylvania Original application November 30, 1926, Serial No. 151,770. Divided and this application March 5, 1930, Serial No. 433,488

19 Claims. (Cl. 73—55)

My invention relates to lighting fixtures and has particular reference to lighting devices for airports and the like.

This is a division of application Serial No. 151,770, filed Nov. 30, 1926 for Beacon and air current indicators and issued as Patent No. 1,874,214.

I contemplate utilizing the beam from a rotating beacon to indicate the wind condition in the vicinity of the beacon to an observer, by means of interruption of the beam.

Among the objects of my invention is to provide means for indicating to an observer, while he is some distance away, the position of the field, or other object intended to be designated by the beacon and the direction and velocity of the wind at the field or other object.

A further object of my invention is to provide a device of the above-indicated character which shall be simple, rugged, easily erected and relatively low in cost and maintenance.

It is common practice in air-port lighting to employ a rotating beacon to designate the location of the landing field, or any other object in order that an observer may orientate himself. The beacon is essentially a powerful searchlight or projector rotatably mounted in such manner that the beam will be projected at a few degrees above the horizontal. The projector may be rotated, by mechanical means, in a horizontal plane at a slow, uniform speed, so that the beam will sweep the horizon and its light will strike an observer's eyes. By this means, the observer is enabled to ascertain the location of the landing field or other object. It is at times desirable that the observer, such as an aviator, should know the direction of the wind current in the immediate vicinity of the field in order that he may make his landing against the wind.

The wind direction is usually indicated by a cloth bag, arranged to swing freely with the wind, and the bag may be illuminated by the light from a number of lamps, reflected from above. Such an air-current indicator is rather indistinct and unsatisfactory, as it can be seen from only a short distance from the field.

My invention provides means whereby the powerful beam from a rotating beacon is utilized, not only to convey information to the aviator regarding the location of the field, but also the direction and velocity of the wind in the vicinity of the field. The device is simple and rugged and allows the combination of rotating beacon and air-current indicator in one unit.

My invention may best be understood by reference to the accompanying drawing, in which Fig. 1 is a view, in front elevation, showing a modification of my device;

Fig. 2 is a view in side elevation of the device shown in Fig. 1;

Fig. 3 is an enlarged view partly in elevation and partly in section of a braking mechanism utilized as a part of my device as shown in Fig. 2;

Fig. 4 is an end view of braking device shown in Fig. 3, and

Fig. 5 is a sectional view of the motor drive taken on line V—V of Fig. 2.

Referring to Figs. 1, 2, and 5, my device comprises a base member or plate 1 suitably anchored on a foundation 2. The base plate is provided with suitable threaded openings for anchoring a casing 3 thereto by means of bolts 4.

To the base is fixed a stationary shaft or post 5. A hollow shaft or sleeve 6 is loosely fitted on shaft 5 to turn freely thereon and rests on suitable bearings 10 in the base plate. A wormwheel 7, slip rings 8 and 9, and the projector support 11 are rigidly mounted on the sleeve 6, near the base thereof. The casing 3 encloses the driving and commutating members and its top wall is provided with a flanged opening 12, which is adapted to be closed by means of the sleeve member 6 and a cap 13.

The projector 14 is mounted on an upright 15, which is a part of the supporting member 11. A bracket 16 is fixed to the projector and is shaped to loosely receive the upright 15. Bolts 17 and 18 clamp the bracket on the upright. The opening for bolt 18 is slotted, as shown at 18a, to permit a small vertical adjustment of the projector 14.

In order to minimize friction, a suitable weight 21 constitutes a part of the projector support 11 and counterbalances the weight of the projector 14. Electrical connection is made with a light source in the projector by means of a cable 22, one lead of which is fastened to the slip ring 8 and the other to the slip ring 9, through an opening 20 in slip ring 9.

The projector is positively actuated, in its rotation around the axis of shaft 5, by a motor 29 which is located within the casing 3 for driving the worm gear wheel 7. Pinion 67, attached to the motor 29 and gear wheel 68, drive the worm gear 7 through a worm 7a.

A weather or wind vane 23 is mounted on an elongated bearing 41 on the post 5 and is rotatably supported by a ball 30, bearing on the upper end of post 5. A collar 53, provided with a downwardly extending flange, acts as a water shed for the junction of sleeve 6 and bearing 41.

The wind vane is comprised of two essentially parallel plates 49 and 50 mounted on the elongated bearing 41 and adapted to be turned by the wind. Plates 49 and 50 support a horizontal bearing sleeve 64 by means of brackets 40 and 60 mounted thereon. An arm, bearing weight 42, is provided to balance the weight of the fan mechanism.

The shuttering or beam modifying means 55a is a wind turbine or fan comprising a metal frame 54 and a hub 55 on which are fixed a plurality of blades 56. The vane and fan are so disposed with relation to the projector that, when the projector has rotated to some such position as shown in Figs. 1 and 2, the fan, when rotating or about to rotate, will modify the light beam.

The fan hub 55 is mounted on a shaft 57, supported within sleeve 64, and the shaft carries the rotating parts of a centrifugal brake, as hereinafter described in detail. The blades occupy about one half of the total projected area of the fan, leaving two open sections, each of substantially one-quarter of the total area. The blades 56 are similar to the blades of a windmill, so that the air current may pass between them and, in doing so, will rotate the fan, but they overlap one another so that the beam from the projector cannot pass through them when they are positioned in front of the projector.

A small weight 58 is fastened to the rim 54 of the fan at a posiiton in one open section equally distant from the two adjacent fan-blade edges. Until the wind attains a predetermined velocity, the weight 58 on the rim overbalances the force of the wind against the fan-blades 56 and will prevent the fan from rotating, because the pressure will not be great enough to raise the weight against the force of gravity. When a predetermined minimum value of velocity of wind is reached, the fan will begin to revolve. The blades and open spaces of the fan traverse the beam projected from the beacon as the fan revolves, and they thereby produce alternate periods of light and darkness. The periodicity is discernible as a flickering of the light, the rapidity of flickering indicating the relative velocity of the air current.

In air currents of extreme velocity, as in a storm, the fan may rotate so rapidly that the flicker is no longer discernible to the naked eye. In order to prevent the fan from running beyond such critical speed, a centrifugal brake (Figs. 3 and 4) is mounted on the inner end of the shaft 57. The brake comprises weights 61, slidably mounted on pins 62 radially projecting from the shaft 57. Normally, the weights will be drawn in toward the center of the shaft by springs 63 and will rest against a shaft-bushing 65. When the critical speed is reached, the centrifugal force of the weights will overcome the tension of the springs and they will fly out against the brake drum 66 to act as brake shoes, thus preventing the fan from exceeding the critical speed. It will be understood that any other suitable form of brake may be employed in lieu of that illustrated.

The fan 55a is disposed on the weather vane, so that it will extend over the light aperture of the projector 14 and intercept the light ray from the projector whenever the projector, in its rotation about the axis of shaft 5, points in the leeward direction.

It may be easily understood that a wind current will move the wind vane 23 to some such position as shown in Figs. 1 and 2. The beam of light from projector 14 will sweep the horizon in the usual way but, on reaching the position shown in Figs. 1 and 2, the beam is interrupted by the fan 55a and its character is changed. From this change in the character of the beam, the observer is enabled to determine the wind direction in the vicinity of the beacon. It is not necessary that the observer be to the leeward of the beacon and thus be directly in the path of the modified beam in order to determine the wind direction; but he is enabled to accurately judge the wind direction by watching the beam as it sweeps the horizon. When a change in the character of the beam occurs in a certain direction, he knows that the wind is in that direction.

By means of my device, an observer can not only locate the air-port or other object or location but he can determine the approximate wind direction and wind velocity at the beacon. The rapidity of movement of the fan is proportionate to the wind velocity and the speed of the fan movement is perceptible to the observer as a flicker varying in frequency with the wind velocity.

The interference device, in this case the fan blades 56, may be comprised wholly or in part of transparent or translucent matrial, such as ruby or other colored glass, or it may be comprised of opaque material.

Of course any beacon rotating mechanism, known to the art, may be utilized. The relative positions of fan, vane and projector may be changed. For instance, the fan might be located to the windward side of the air vane.

I do not wish to be limited to the embodiments of my invention as shown and described, and the suggested modifications, and any other modifications which may occur to those skilled in the art, may be made without departing from the spirit and scope of my invention, as expressed in the appended claims.

I claim as my invention:

1. A beacon for projecting a beam of light comprising a rotatable projector, means for rotating the projector, a wind-driven screen rotatable relative to the projector in two different planes, said screen being rotatable in one of the planes in accordance with the wind velocity in the vicinity of the beacon, and means for rotating the screen in accordance with the wind direction in the other plane about the axis of rotation of the projector to position it in the path of the beam of light from the projector as the projector is rotated, thereby modifying the light-beam at a frequency proportional to the wind velocity to indicate both wind direction and velocity to an observer.

2. A rotatable beacon for projecting a light-beam so directed as to be swept, by rotation of the beacon, about the axis of rotation of the latter, a device comprising a wind-operable shutter mounted for rotation about an axis substantially at right angles to and coplanar with the axis of rotation of said beacon for locally intercepting the beam in its sweep, said device being independently adjustable about the source of the beam to correspondingly shift the location of the eliminated sector of its sweep, and a wind vane for controlling the adjustment of said device.

3. The combination with a rotatable light-beam projector adapted to so direct the beam that rotation of the projector will correspondingly sweep the beam about the axis of rotation of the projector, of a wind vane independently rotatable about the axis of rotation of the projector, and a wind-driven screen provided with openings and rotatably mounted on the wind vane in a position to intercept the rotating light-beam in the leeward direction, the speed of rotation of the screen being a function of the wind velocity at the beacon thereby modifying the light-beam at a frequency proportional to the wind velocity to indicate both wind direction and velocity to an observer.

4. The combination with a rotatable light-beam projector adapted to so direct the beam that rotation of the projector will correspondingly sweep the beam about the axis of rotation of the projector, of a vane so operable by air currents as to be positioned thereby in accordance with the direction of said currents, a screen carried by the wind vane and positioned to intercept the light-beam when, during its rotation, it is directed in the leeward direction, said screen being provided with alternate light openings and relatively opaque portions, and means for rotating the screen about an axis substantially at right angles to and coplanar with the axis of rotation of said projector in accordance with the velocity of the air currents thereby modifying the light-beam by means of the light openings and relatively opaque portions to indicate both wind direction and velocity to an observer.

5. The combination with a rotatable light-beam projector having a light source mounted therein and means for rotating said projector as to cause its light-beam to sweep through a predetermined path, of signalling means comprising a vane adapted to be positioned by, and in accordance with the direction of, the air currents impinging thereon, and a wind-driven screen rotatable in accordance with the velocity of the air currents and mounted on and moving with the vane to project over the light aperture of said projector during the portion of its sweep when directed in the leeward direction, the screen being provided with alternate light openings and relatively opaque portions to screen the light at a frequency in accordance with the velocity of the air currents.

6. The combination with a rotatable light-beam projector having a light source mounted therein and means for so moving said projector as to cause its light-beam to sweep through a predetermined path, of signalling means comprising a vane adapted to be positioned by, and in accordance with the direction of, the air currents impinging thereon, and a movable wind-driven screen attached to and moving with said vane and adapted to project over the light aperture of said projector during any portion of its sweep, said screen being movable by wind pressure and provided with alternate light openings and relatively opaque portions to screen the light at a frequency in accordance with the velocity of the air currents thereby simultaneously affording an indication of both the direction and velocity of the air currents.

7. The combination with a rotatable light-beam projector adapted to so direct the beam that rotation of the projector will correspondingly sweep the beam about the axis of rotation of the projector and means for positively rotating said projector, of a vane adapted to rotate freely and to be positioned in accordance with the direction of the air currents impinging thereon, and rotatable screening means rotatable about an axis substantially at right angles to and coplanar with the axis of rotation of said projector and carried by said vane and adapted to project over the light aperture during any portion of its sweep for altering the light-beam.

8. A beacon comprising a base, a standard fixed to the base, a sleeve rotatably mounted on the lower portion of the standard, a light-beam projector mounted on the sleeve, a second sleeve rotatably mounted on the upper portion of the standard, an air vane mounted on the second sleeve, a rotatable shaft carried by the air vane, and a fan mounted on the shaft and disposed to intercept the light-beam.

9. In combination with a rotatable beacon having an upwardly projecting standard, means for rotating the beacon, a wind vane rotatably mounted on the standard, and a fan rotatably mounted on the vane, the fan being provided with a plurality of irregularly spaced blades and adapted to be actuated by wind pressure for modifying the light from the beacon when, during its rotation, the light-beam comes into register with the fan.

10. In combination, a rotatable, beam-projecting beacon and a screen rotatably mounted for movement about the beacon, means for rotating the beacon, a wind vane operatively attached to the screen for positioning it in accordance with the wind direction, said screen comprising a wind turbine the blades of which act both as a means for driving the turbine and for interrupting the beam in accordance with the wind velocity.

11. In combination, a beacon and a wind-operable shutter for periodically interrupting the light to indicate wind velocity, and means for preventing operation of the shutter at low wind velocities comprising a weight located on the shutter in such manner that the weight must be lifted when the shutter becomes operable, the weight acting to prevent operation.

12. In combination, a beacon and a rotatively mounted fan driven by wind pressure for periodically interrupting the light from the beacon to indicate the wind velocity, and means comprising a weight on the edge of the fan for preventing rotation of the fan below a certain minimum wind velocity.

13. In combination, a rotatable beacon, means for positively rotating the beacon, a fan rotatably mounted on the beacon and driven by wind pressure for periodically interrupting the light from the beacon to indicate the wind velocity, and means comprising a centrifugal brake mounted on the fan for preventing rotation thereof above a certain maximum speed.

14. In combination, a rotatably mounted projector provided with a source of light and adapted to project a light-beam, means for rotating said projector, and a wind vane positioned in response to air currents and provided with a screen including revolving shutters responsive to the wind velocity, said screen being adapted to rotate with said wind vane and being so disposed as to rotate in the same plane as the rotating projector and between said projector and the majority of the beam projected at any instant and to interrupt the beam at a point determined by the wind direction.

15. A beacon for projecting a light-beam comprising, in combination, a beam-projecting means rotating in a constant plane, means for rotating the projecting means, a wind vane, and an independently rotatable screen carried by the wind vane, said screen being responsive to air currents and including shutters rotatable about an axis positioned substantially at right angles to and coplanar with the axis of rotation of said beacon in response to wind velocity, said shutters being so disposed as to progressively vary the intensity of the light of the majority of the beam projected at any instant at points in the travel of said projecting means determined by the wind direction and in inverse proportion to the wind velocity.

16. In combination, a beam-projecting beacon rotatable in a constant plane for transmitting information to an observer, means for rotating the beacon, wind responsive means revolvable about the axis of rotation of said beacon, and means comprising a wind-driven shutter rotatable about an axis positioned substantially at right angles to and coplanar with the axis of rotation of said beacon and fixed to the revolvable means and having its path of travel so determined as to modify the intensity of the light-beam at a point corresponding to the prevailing wind direction, as determined by the wind responsive means, and in inverse proportion to the wind velocity, as determined by the rotatable shutter.

17. A beacon comprising, in combination, a rotatable projector for projecting a light-beam in a constant path, means for rotating the projector, wind-direction-responsive means and a screen attached thereto, said beam being adapted to be partially intercepted by said screen during a part of the travel of said beam, the screen being provided with shutters rotatable about an axis positioned substantially at right angles to and coplanar with the axis of rotation of said beacon by wind pressure for interrupting the light-beam in accordance with the wind velocity.

18. A beacon comprising, in combination, a rotatable projector for projecting a light-beam in a constant path, means for rotating the projector, a wind vane, and a wind-driven screen mounted for rotation about an axis substantially at right angles to and coplanar with the axis of said beacon on the wind vane and independently movable in accordance with wind velocity, said light-beam adapted to be partially intercepted by said screen at a point in the travel of said beam determined by the direction of the wind.

19. A beacon for projecting a beam of light in a constant path comprising a rotatable projector, means for rotating the projector, a wind vane independently movable about the axis of rotation of said beacon in accordance with wind direction, and a wind-driven screen carried by the wind vane and provided with light-interrupting members rotatably mounted about a horizontal axis, said light-interrupting members being rotatable at a speed corresponding to wind pressure.

OSCAR WERNER.